Aug. 25, 1959 F. H. RAYMOND ET AL 2,901,605

IMPROVEMENTS IN/OR RELATING TO ELECTRIC PULSE RESHAPING CIRCUITS

Filed Oct. 6, 1954

INVENTORS.
FRANCOIS HENRI RAYMOND
AND JACQUES ALBIN
BY Theodore Haefeli
ATTORNEY United States Patent Office 2,901,605 Patented Aug. 25, 1959

2,901,605

IMPROVEMENTS IN/OR RELATING TO ELECTRIC PULSE RESHAPING CIRCUITS

François Henri Raymond, Saint-Germain-en-Laye, and Jacques Albin, Le Vesinet, France, assignors to Societe d'Electronique et d'Automatisme, Courbevoie, France Application October 6, 1954, Serial No. 460,633

Claims priority, application France December 18, 1953

3 Claims. (Cl. 250—27)

Figure 1:
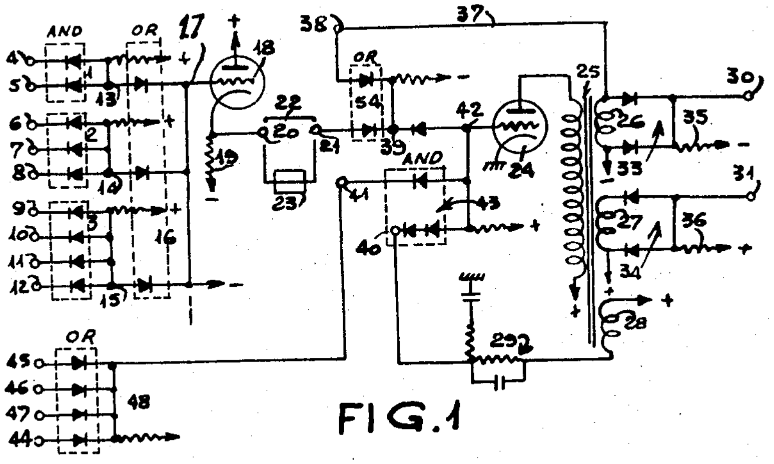

This invention relates to improvements in electric pulse reshaping circuits.

One object of the present invention is to provide an improved electric pulse reshaping circuit, which may be found to facilitate and simplify the design and manufacture of well known electronic digital computers wherein:

(1) Any numerical computation is carried out with electrical representations of numerical quantities written in the binary scale notation. Each numerical quantity is available as a coded group or train of electric pulses and, for example, each pulse period of this group or train may present a voltage pulse of a predetermined level, illustratively a higher level, when the pulse period simulates the digital value 1, and a lower level of voltage maintained in each pulse period wherein the digital value 0 is simulated. In certain places of such a computer, however, these pulse trains may be staticized but, in such static representations, the higher and lower level conventions may be preserved, the voltage value statically representing the digital value 1 being higher than the voltage value representing the digital value 0;

(2) Any computation is converted through suitable programming and by means of correspondingly designed circuits, to a set of operations resorting to the well-known logical algebra, viz. Boolean algebra. These logical operations are chiefly the And and Or, and their electrical interpretations are as follows:

(*a*) An And circuit will receive a plurality of input signals upon a corresponding plurality of input terminals and deliver on a single output terminal a signal of a predetermined voltage level, illustratively a signal of a higher level, but will do this only when all the input signals are at their higher voltage levels, each representing the digital value 1, i.e., the output represents the logical product "And";

(*b*) An Or network, on the other hand, will receive a plurality of input signals upon a corresponding plurality of input terminals and will deliver on a single output terminal a signal of a predetermined voltage level, illustratively the higher voltage level, each time one at least of the input signals presents a higher voltage level, representing the digital value 1, i.e., the output represents the logical product "Or." Such circuits may be embodied, in the electronic switching art, by means of networks of crystal diodes or similar unidirectionally conducting elements, as will be explained hereafter. In addition, in computers to which the present invention is applicable, it is normal for any signal to be available in both the following representations:

(*a*) A first representation, normally called a true representation, and (*b*) A second representation, normally called the complemental representation in which the meanings of the higher and lower voltage levels are interchanged, the higher level representing the digital value 0 and the lower one the digital value 1. In this specification, any signal appearing in its true representation or waveform will be denoted S or T and its complemental representation or waveform will receive the notation $\bar{S}$ or $\bar{T}$;

(3) The cycles and phases of operation in computers to which the present invention is applicable, or the combinations of the signals in the And circuits and Or networks are determined by means of at least one, in most cases several, uninterrupted series of reference pulses of finely shaped waveforms. Each of these series of pulses also are available in true and complemental waveforms. Such pulses are usually called timing or clock pulses and, in the present disclosure, they will be called synchronisation pulses.

In such well known computers, it is apparent that the problem of reshaping the information pulses therein is an important one. In this respect, pulse regenerative amplifiers have been developed, in which each information pulse has its shape renewed under the control of a corresponding synchronisation pulse. Another important problem, mainly arising in those computers which make use of several series of time-staggered synchronisation pulses, relates to the requirements of frequently imparting certain predetermined delays to the information pulses. These two problems appear to have been separately dealt with in the prior art since separate packages have been proposed for reshaping the information pulses on the one part, and for delaying the information pulses on the other part. A further object of the invention therefore (not necessarily satisfied by all the forms of the invention) is to provide a valve circuit which, in addition to its flexibility concerning any logical operation "And" and "Or" also provides means for both the regeneration and, when required, the delaying of the information pulses applied thereto.

One other aspect of the handling of the information pulses, which does not appear to have been previously realized or provided for, relates to the pulse regeneration problem. This concerns the provision, if so required, of such pulse lengthening means that distinct series of information pulses, previously renewed by means of time-staggered synchronisation pulse series in separate pulse regenerative amplifiers, will issue from these amplifiers, or further ones in their respective transmission paths, with at least a partial time coincidence of their pulses, so that these pulses can further be renewed in the same timing phase. This will illustratively be the case of a so-called parallel adder wherein the "carries" are progressively operated with a time shift from the digit pulses which are initiating them.

According to the present invention, an electric pulse reshaping circuit comprises a plurality of And circuits and, Or circuits and a buffer stage in combination with a pulse regenerative amplifier, in which (*a*) Each And circuit has at least one input terminal for the application thereto of an information signal, at least one other input terminal for the application thereto of a synchronisation signal, and has a single output terminal, (*b*) Each Or circuit has its input terminals connected to an And circuit output terminal and has an output terminal, (*c*) The buffer stage comprises a vacuum tube and an associated output load resistor, the control grid of said vacuum tube being connected to an Or circuit output terminal, and (*d*) The pulse regenerative amplifier has at least one input circuit for connection with the load resistor of the buffer stage, one other input circuit for the application thereto of at least one synchronisation signal and a further input circuit connected to another Or circuit output terminal, an amplifier vacuum tube, having an input terminal coupled to said three input circuits at least one output terminal and a regenerative feedback loop across the amplifier vacuum tube.

Figure 2:
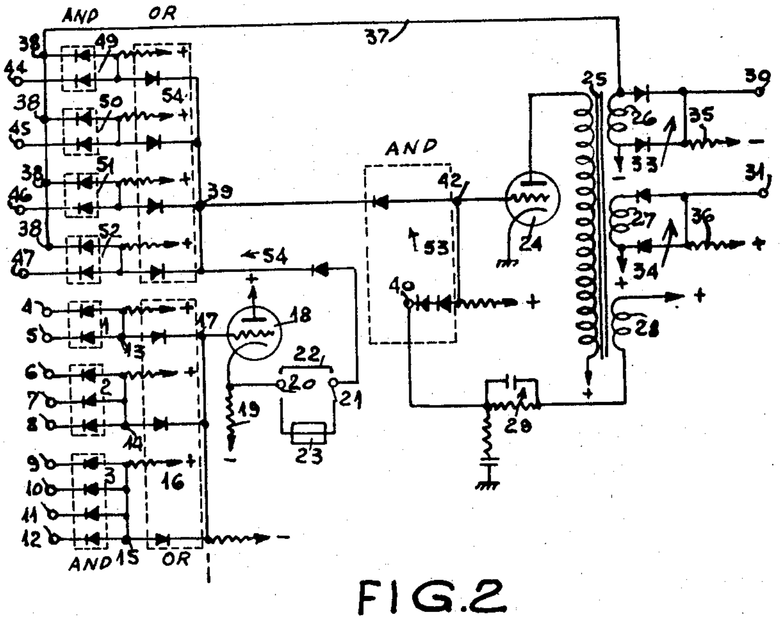
Figure 3:
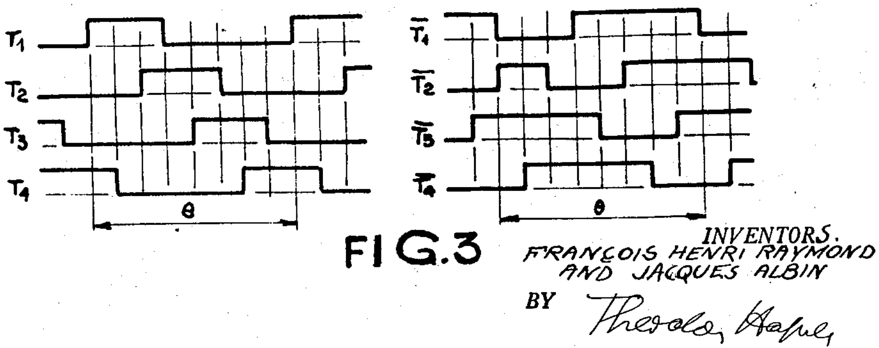

Electric pulse reshaping circuits in accordance with the present invention will now be described, by way of example only, with reference to the accompanying drawings, wherein:

Figs. 1 and 2 illustrate embodiments of electric pulse reshaping circuits in accordance with the invention, and Fig. 3 illustrates four series of time-staggered synchronisation pulses which may be made use of in the electric pulse reshaping circuits shown in Figs. 1 and 2.

In the embodiments shown in Figs. 1 and 2, Or and And circuits are shown which make use of unidirectionally conducting elements such as germanium or vacuum diodes. We find it preferable if an electric pulse reshaping circuit in accordance with the invention includes one vacuum double-triode tube.

In both Figs. 1 and 2, the electric pulse reshaping circuit shown has a plurality of And circuits, for a selective application thereto of several input information signals. Three circuits are shown, but this number may be increased if so required. A circuit 1 has two input terminals 4 and 5, a circuit 2 has three input terminals 6, 7 and 8, and a circuit 3 has four input terminals 9, 10, 11 and 12. Each of these input terminals is connected to the cathode of a diode element. The anodes of the diode elements in each circuit are connected to a point which receives a positive bias through an appropriate resistor and which also constitutes the output terminal of the circuit. These three points, 13 for the circuit 1, 14 for the circuit 2, 15 for the circuit 3, form the three input terminals of an Or circuit 16. In the Or circuit 16, each input terminal 13, 14 or 15 is connected to the anode of a diode and all the cathodes of the diode elements are connected to a common point 17 which receives a negative bias and constitutes the output terminal of the union network 16.

The point 17 is connected to the control grid of a triode vacuum tube 18 constituting a buffer stage in the classical meaning of this term. The buffer stage is a cathode follower in that it includes a load resistor 19 connected between the cathode and earth, across which resistor 19 will be delivered the output signal of the triode tube 18. The provision of a cathode follower as a buffer stage is, as well known, an advantage in that it facilitates the impedance matching from an output terminal 20 with any input impedance of a further network of diode elements.

Spaced apart from the terminal 20 is another terminal 21 which constitutes the input terminal of a pulse regenerative amplifier, which will be explained later. When the signal appearing at 20 does not require to be delayed, a mere galvanic strap 22 may be placed between the terminals 20 and 21. When such a delay must be provided, a delay element 23 can be introduced, connected between the terminals 20 and 21. The delay element 23 may be of the artificial delay line kind, the characteristic or iterative impedance of which may be matched easily with both the impedance seen from the terminal 20 and the impedance seen from the terminal 21. The delay line may comprise several elementary delay sections of a definite transit time, say $\theta/4$ if $\theta$ denotes the time length of a pulse period in any information or synchronisation signal, in which case an appropriate number of such elementary sections connected in series between the terminals 20 and 21 will provide for any required transit time of pulses required therethrough.

When the voltage input at any of the terminals 4 to 12 is of a lower value, i.e., when no signal appears at these terminals, the corresponding diode element is made conducting and the lower value potential is then brought to the output terminal of the concerned circuit. When all the voltage inputs at the terminals of one of these And circuits 1 to 3 are of their higher value, i.e., when a voltage pulse denoting the digit 1 appears at these terminals, all the diode elements in the concerned circuit become non-conducting and the potential at the output terminal of that circuit becomes high, and attains the value of the positive bias voltage thereto. In this way, each of the three circuits 1 to 3 actually acts as an And circuit for such input signals. If the digit 1 is denoted by a lower voltage value, a corresponding And circuit may be obtained by reversing the direction of connection of the diode elements and supplying common negative bias in place of the common positive bias.

The signals applied to the various input terminals of the And circuits may be either information signals or synchronisation pulse signals, and this is not important to the operation of the valve circuit, but will vary from valve circuit to valve circuit within any computer which incorporates such valve circuits. If, for example, the terminals 4 and 5 of the And circuit 1 receive different information signals, the output of circuit 1 will deliver a pulse train representing the logical product of the quantities carried by the signals. If, for example, the terminal 4 receives a pulsated information signal and the terminal 5 receives a synchronisation pulse signal, only the parts of the information signal which are of a higher voltage value in time coincidence with the pulses of the synchronisation signal will be transmitted to the output 13 of the circuit 1. In this way, it is possible to reduce the width of the information pulses and it is also possible to reset to a predetermined phase (without regeneration proper), the pulses existing in the information signal. The terminals 6 and 7 of the And circuit 2 may, for example, each receive an information signal, and the terminal 8 a synchronisation pulse signal, in which case the signal appearing at 14 will represent the logical product of the two information signals when the synchronisation pulse signal is also present. In another example, an information signal comprising widened pulses may be applied at 6 and two synchronisation pulse signals with time-staggered pulses having a time-coverage with respect to each other may be applied at 7 and 8, in which case the incoming information signal may be transmitted with either a preservation of the width of its pulses or a reduction of this width to the combined width of the synchronisation pulses.

A signal issuing from an output terminal 13, 14 or 15 of one of the And circuits 1, 2, or 3 will not by itself have any effect upon the other two And circuits as the respective diode elements of the Or circuit 16 are non-conducting (i.e., at rest) when the potentials at 13, 14 or 15 are of their lower value. When one of the points 13, 14 or 15 is at its higher value of potential, the corresponding diode element of Or circuit 16 will become conducting and apply that higher value potential to the point 17; the triode 18 which was previously non-conducting will become conducting and the higher value potential will be transmitted across the resistor 19. Thus, when the potential at 17 becomes high, the other diode elements are blocked from their cathodes. Of course, in the Or circuit 16, any diode element which becomes conducting ensures the blocking of all the other diode elements in the network, and the sole discrimination between such diode elements will be the time discrimination of the appearance of signals upon their anodes. If two of these signals appear in partial time coincidence, the second in time will maintain the action of the first without any interruption with respect to the tube 18.

Whatever may be the combinations of input signals to the And circuits 1 to 3, it is apparent that in any case, that part of the unitary valve circuit which is comprised between these inputs and the point 20 will so act as to ensure both the required logical functions and the electronic switching functions for which this circuit will be set in the general design of any computer within which it is included.

As previously stated, the terminal 21 is, within the unitary valve circuit, the input terminal of the pulse regenerative amplifier proper. This amplifier comprises a triode vacuum tube 24, with its plate connected to the high tension supply through the primary winding of a transformer 25. This transformer comprises at least one secondary winding 26 across which each positive pulse appearing at the control grid of the triode 24 will be repeated with the same polarity; preferably it will further comprise a second secondary winding 27, of a direction of winding opposite to that of the secondary winding 26, so that across the winding 27 will appear a voltage which is the complement of a voltage across the winding 26. Further again, the transformer 25 preferably includes a third secondary winding 28 which acts as a negative feedback winding as its current is fed-back onto a control electrode of the triode tube 24 in order to lower the internal impedance of this tube when conducting. If the internal impedance of tube 24 is lowered in this known manner, then the actual impedance of the transformer 25 may also be reduced. In addition, such a negative feedback will improve the edges of any pulse transmitted through the pulse regenerative amplifier and, in this respect, a network 29 has been shown in the feedback connection from the winding 28, for the purpose of advancing the phase of the negative feedback.

An output voltage from each of the secondary windings 26 and 27 is taken off, at 30 and 31 respectively, through a diode network comprising two diodes, each one in series connection with an end of the winding to a common point receiving a suitable bias through the resistors 35 and 36 respectively; this bias is negative and applied to the cathodes of the diode elements of the network associated with the winding 26 and is positive and applied to the anodes of the diodes associated with the secondary winding 27. At 30 will appear the true regenerated signal S and, at 31, the complemental signal S. The provision of such diode networks between the secondary windings and their output terminals ensures the cancellation, at these outputs, of the stray variations of voltage which would otherwise appear from the backswing of the plate current through the primary winding of the transformer when the tube 24, after having been brought to its conducting state, is then returned to its non-conducting condition.

From a suitable calibration or adjustment of the characteristics of the tube 24 and the transformer 25, the time intervals during which the tube 24 can be conducting can be made relatively lengthy without impeding the operation of the regenerative process and, more generally, without impeding the operation of the complete circuit. As stray backswing voltages are blocked, the signals issuing from the output terminals 30 and 31 do not present any D.C. component and it is naturally convenient, for the action of these signals upon further circuits, that their mean component remains within reasonably narrow limits.

The terminal 21 is connected to a point 39 through one of the diode elements of an Or circuit 54, and point 39 is connected through a further diode element of opposite direction of conduction to the input of an And circuit, 43 in Fig. 1, 53 in Fig. 2. The output of this And circuit is connected to the control grid of the tube 24.

The And circuit 43 or 53 may be considered noteworthy in that in each case one of the inputs receives the current from the feedback winding 28 of the transformer 25. When no positive signal enters at 21, the negative bias voltage of point 39 is brought to the point 42. The biasing voltage of winding 28 is positive and the diode elements between the terminal 40 and the point 42 are non-conducting. In the network 43 (Fig. 1) further, through the input terminal 41 of the network 43 a negative bias is applied to point 42 when no signal is present upon terminal 41, even if the potential at point 39 becomes high. In both Fig. 1 and Fig. 2, the negative feedback is thus suppressed during each and every interval of rest of the circuit. As soon as the voltage at 42 becomes high, for the transmission of a signal, the voltage across 28 decreases. These two conditions, high potential at 42 and reduced potential at 28 prepare the feedback diode elements between terminal 40 and point 42 to become conducting, and they actually become conducting as soon as the voltage fed back through the feedback loop becomes lower than the potential applied to the point 42; the diode elements connected at the terminals 39 and 41, Fig. 1, or the diode element connected from the terminal 39 to point 42, Fig. 2, remaining non-conducting. The control grid of the tube 24 thus receives the signal across 28, and this provides an amplitude limitation, since the signal across 28 decreases as the current passed by the tube 24 to its cathode increases. In this way, too, the apparent internal impedance of the tube 24 is reduced with respect to the impedance of the primary winding of the transformer 25. Denoting by N the ratio between the primary winding and the secondary winding 28 of the transformer 25, by R the internal resistance of the tube 24, and by M the gain of tube 24, the apparent resistance seen by the primary winding of the transformer 25 as soon as the negative feedback is operative becomes $R/(1+MN)$.

As soon as the coincidence in time of the signals at points 39 and 41, Fig. 1, disappears, or merely the signal at 39 in Fig. 2, the feedback channel is blocked since a negative bias is applied at 42.

In Fig. 1, the other terminal 38 of the Or network 54 is connected by a conductor 37 to one end of the secondary winding 26 of the transformer 25, thus forming a regenerative feedback loop. The terminal 38 is connected through a diode element to the point 39. Thus, as soon as the signal fed back through 37 reaches a value higher than the value of the signal at 21, for example when the signal at point 21 disappears and for as long as the voltage at 42 remains at its higher value, the signal fed back through 37 is substituted for the signal at 21, without any interruption, until the potential at 41 falls to its lower value.

The triode tube 24 can only be brought to its conducting state when the potential at both 39 and 41 is at a higher value. A regeneration process is initiated as soon as the signal appears at 41, in coincidence or part coincidence with a signal at 21 and the regeneration process will be maintained, even if the signal at 21 disappears, until the disappearance of the signal at 41. Conversely, if the first signal to appear is the synchronisation signal at 41, the regeneration process is initiated as soon as an information signal appears at 21 in coincidence or part coincidence with the signal at 41. From these conditions of operation of the pulse regenerative amplifier, there clearly appears the possible uses of such a device: reshaping the information pulses both in waveform and length, phasing the information pulses with a required series of synchronisation pulses and consequently shortening or lengthening the information pulses.

Regarding the shortening or lengthening of the information pulses, it must be noted that a unitary valve circuit according to the invention provides two possible methods of modifying the length of the information pulses:

(*a*) As previously stated, through the possible action of the input And circuits 1, 2, 3 . . . when several synchronisation pulse signals with relative time-shifts between them are applied to corresponding inputs of the And circuits together with information signals applied to other terminals of the networks;

(*b*) Through the provision of such a Or circuit as shown at 48 in Fig. 1 which has a plurality of input terminals such as 44 to 47 for the application thereto, in any required combination, of time-staggered series of synchronisation pulses. To the four terminals 44 to 47 may be selectively applied combinations of the four synchronisation pulse signals T1, T2, T3, T4 and of their four complemental signals, $\bar{\mathbf{T}}$1, $\bar{\mathbf{T}}$2, $\bar{\mathbf{T}}$3, $\bar{\mathbf{T}}$4, Fig. 3. It can be seen that in the signals T1 . . . T4 the pulses partially overlap so that by using one or more of these signals in combination synchronisation pulses of any length may be obtained at point 41.

In the arrangement of Fig. 2, a Or network such as 48 in Fig. 1 is not included, but instead four And circuits are provided, 49, 50, 51, 52 wherein the synchronisation pulse signals T1 to T4 of Fig. 3 may be selectively applied to the terminals 44 to 47, whereas the other terminals 38 of these And circuits 49 to 52 are all connected to the feedback conductor 37 from the output of the amplifier. In such an arrangement, any signal issuing at 21 from the input part of the circuit is applied to the tube 24, but the regenerative process is only maintained if one at least of the terminals 44 to 47 receives a synchronisation pulse signal. The four output terminals from the And circuits 49 to 52 constitute inputs to a Or circuit 54 to which the signal from 21 is also applied.

It is apparent that any other form of pulse regenerative amplifier, basically constituted by a blocking oscillator arrangement, may be employed, in place of the ones shown in Figs. 1 and 2, in an electric pulse shaping circuit in accordance with the present invention, provided that the desired conditions of operation are obtained.

We claim:

1. An electric pulse reshaping circuit comprising a plurality of And circuits and Or circuits; each And circuit having at least one information input terminal, at least one synchronization input terminal, and an output terminal; each Or circuit having at least a number of input terminals each coupled to an And circuit output terminal, and an output terminal; a buffer stage comprising a vacuum tube and an associated output load resistor; said vacuum tube having a control grid coupled to an Or circuit output terminal; and a pulse regenerative amplifier having an input terminal coupled to said load resistor and to another Or circuit output terminal, and at least one output terminal; and a regenerative feedback loop coupling said amplifier output terminal to at least one And circuit input terminal associated with said other Or circuit.

2. An electric pulse reshaping circuit as claimed in claim 1, wherein said other Or circuit has an input terminal coupled to said load resistor.

3. An electric pulse reshaping circuit as claimed in claim 1, wherein said regenerative amplifier includes a vacuum tube having a control electrode, and said other Or circuit has an output terminal coupled to said control electrode.

References Cited in the file of this patent

UNITED STATES PATENTS

| | | |
|---|---|---|
| 2,485,101 | Lindahl | Oct. 18, 1949 |
| 2,498,636 | Bassett et al. | Feb. 28, 1950 |
| 2,617,883 | Anger | Nov. 11, 1952 |
| 2,628,346 | Burkhart | Feb. 10, 1953 |
| 2,670,445 | Felker | Feb. 23, 1954 |
| 2,674,727 | Spielberg | Apr. 6, 1954 |
| 2,685,049 | Steinberg | July 27, 1954 |
| 2,758,205 | Lubkin | Aug. 7, 1956 |
| 2,787,707 | Cockburn | Apr. 2, 1957 |